United States Patent

[11] 3,578,824

| [72] | Inventor | Earl R. Woodward, Jr.<br>Mars, Pa. |
|---|---|---|
| [21] | Appl. No. | 809,587 |
| [22] | Filed | Mar. 24, 1969 |
| [45] | Patented | May 18, 1971 |
| [73] | Assignee | Woodward, Inc.<br>Mars, Pa. |

[54] ENDLESS TRACK TREAD
2 Claims, 3 Drawing Figs.

[52] U.S. Cl. .................................................. 305/54
[51] Int. Cl. ............................................. B62d 55/26
[50] Field of Search .......................................... 305/54, 51,
13, 11, 40, 47, 48, 49, (Cursory)

[56] References Cited
UNITED STATES PATENTS

| 1,238,079 | 8/1917 | Bager | 305/11 |
|---|---|---|---|
| 1,316,627 | 9/1919 | McKenzie | 305/58X |
| 1,952,545 | 3/1934 | Gotshall | 305/54X |
| 2,177,936 | 10/1939 | Esters | 305/51 |
| 3,336,088 | 8/1967 | Bawer | 305/54 |

*Primary Examiner*—Richard J. Johnson
*Attorney*—William J. Ruano

ABSTRACT: An endless track tread involving the use of two pieces of plate which are welded together in offset relationship at both ends and drilled, or the use of a unitary section of plate of similar offset outline, for use as one of the plurality of overlapping and nesting treads of a self-propelled tractor vehicle.

PATENTED MAY 18 1971

3,578,824

INVENTOR.
EARL R. WOODWARD, JR.
BY
*William J. Ruano*
his ATTORNEY

ENDLESS TRACK TREAD

This invention relates generally to an endless track-type tread such as used in earthmoving or digging vehicles and, more particularly, relates to the tread construction and method of making the same.

In the past, endless track treads have been cast into a rectangular shape, which casting involved expense and appreciable time to manufacture. Since the entire tread had to be cast of the same metal, it was necessary to use a comparatively expensive alloy of high strength throughout to withstand friction and abrasion to which the endless track treads are normally subjected. Furthermore the treads were usually arranged in butting relationship.

I have overcome the above-named disadvantages by either machining and drilling a thick section of plate into proper size and shape, or by providing separate plates and welding them together in offset relationship to form a particular shape of tread for nesting with an adjacent tread to overcome the above-named disadvantages.

A more specific object is to provide separate plates of either the same or different alloys and welding their faces together while the plates are slightly offset as the top at one end and at the bottom at the other end, so as to provide a novel-type tread that will nest and provide long life.

Other objects and advantages will become more apparent from a study of the following description, taken with the accompanying drawing wherein.

Figure 1:
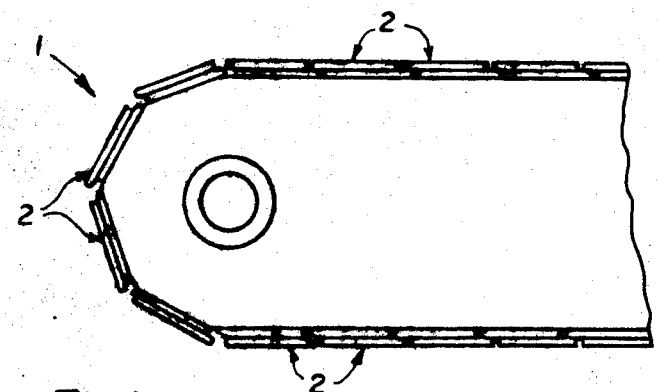
FIG. 1 is a fragmentary side view of an earthmoving vehicle showing endless track treads of a construction embodying the present invention.

Referring more particularly to FIG. 1 of the drawing, numeral 1 generally denotes a tractor-type vehicle driven by endless belt or chain (not shown) such as used in army tanks and earthmoving vehicles, comprising a plurality of treads denoted by numeral 2 which are attached to an endless chain, such as used on a conveyor, and linked together so as to form a continuous loop or chain of tread elements adapted to nest together while at the top or bottom of the chain drive, as shown in FIG. 1.

Figure 2:
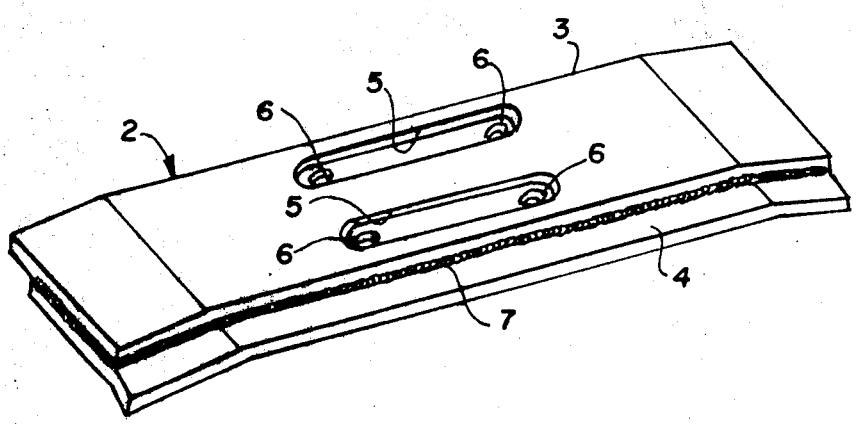
FIG. 2 is a top perspective view of one of the endless track treads of a construction, contemplated by the present invention, involving welding together opposite faces of two separate plates.

FIG. 2 shows one form of the endless track tread comprising two separate plates 3 and 4, of about ½ inch thickness each, which may be made either of the same alloy or of different alloys such as a greater wearing alloy for plate 4 which engages the ground surface, than for the base plate 3 which does not contact the ground surface but which has holes 6 drilled therein through which bolts are extended for connection to the conveyor chain drive. The plates 3 and 4 are slightly offset in the direction of drive, as shown, and then welded together along the weld line denoted by numeral 7. The rear edge (not shown in FIG. 2) may also be welded to form a rectangular outline. Grooves 5 are then machined in the top plate 3, and holes 6 are drilled in the bottom plate 4. Thus the bolt heads will rest on plate 4 and will be confined within grooves 5.

Figure 3:
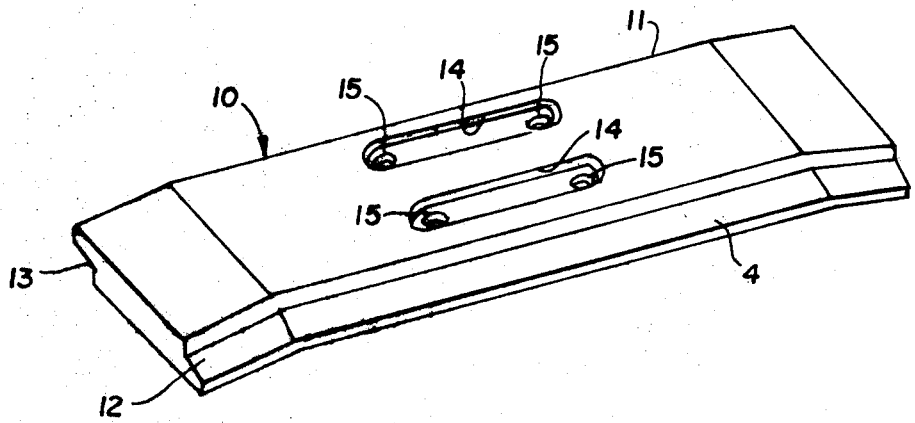
FIG. 3 is a modification of the tread shown in FIG. 2 involving a one-piece plate which is machined and drilled to shape.

FIG. 3 shows a modification of the tread shown in FIG. 2 wherein the tread, designated by numeral 10, is made of one unitary plate of about 1-inch thickness which is machined at 12 and 13 to form offsets similar to those in FIG. 2 and wherein grooves 14 are drilled in the upper plate 11 and holes 15 are drilled in the bottom plate 4. Since the unit is made of a single plate, rather than being cast, it will be less expensive to manufacture and more resistant to wear and abuse in operation. The offsets 12 and 13 enable adjoining treads to overlap or nest together as shown in FIG. 1.

As shown in FIGS. 2 and 3, the lateral end portions of each tread are inclined slightly in a direction toward the interior of the chain and at right angles to the direction of drive to provide better clearance.

Thus it will be seen that I have provided a novel method of making or fabricating an endless track tread for earthmoving vehicles and the like, which eliminates the necessity of casting the treads and, instead, permits the use of one, or a pair of plates welded together of the same or different alloys and with opposite ends offset, to permit nesting together, whereby the cost of manufacture is reduced and yet the strength of the finished tread is considerably increased over that of a cast tread.

While I have illustrated and described several embodiments of my invention, it will be understood that these are by way of illustration only and that various changes and modifications may be made within the contemplation of my invention and within the scope of the following claims.

I claim:

1. In an endless track comprising a plurality of treads in an endless path, each tread comprising a flat top metal plate stacked upon and contacting a flat bottom metal plate, said top plate having a portion offset from and overhanging an edge of said bottom plate, said bottom plate having an opposite edge which is offset from an edge of said top plate in the direction of drive, said top and bottom plates being welded together along at least one of said edges, groove means extending only through said top plate, and a plurality of holes extending only through said bottom plate in registry with said groove means through which bolts may be projected for fastening to said endless track, said top plate contacting said bottom plate throughout its entire bottom surface area except for said offset portions and said groove means.

2. Apparatus as recited in claim 1 wherein said top and bottom plates are welded together along both said edges and wherein each tread has lateral end portions which are inclined slightly towards the interior of the track in a direction at right angles to the direction of drive.